United States Patent

McConnell et al.

[15] 3,701,336
[45] Oct. 31, 1972

[54] PIPE COATING APPARATUS

[72] Inventors: William M. McConnell; William H. Bradley, both of Ben Avon; Howard E. Chappel, Butler; George P. Whitfield, Greentree; Raymond L. Carey, Pittsburgh, all of Pa.

[73] Assignee: Taylor-Wilson Manufacturing Company, Pittsburgh, Pa.

[22] Filed: March 16, 1970

[21] Appl. No.: 24,460

Related U.S. Application Data

[62] Division of Ser. No. 723,411, April 23, 1968, Pat. No. 3,559,794.

[52] U.S. Cl. ............... 118/423, 134/127, 214/1 P
[51] Int. Cl. .................................................. B05c 3/10
[58] Field of Search ........ 118/423, 425, 426; 134/48, 134/67, 68, 124, 125, 127; 214/1 P; 198/41, 103

[56] References Cited

UNITED STATES PATENTS

| | | | |
|---|---|---|---|
| 1,892,670 | 1/1933 | Jaeger | 198/103 |
| 1,935,087 | 11/1933 | Free | 118/423 |
| 2,184,610 | 12/1939 | Church | 118/423 |
| 2,642,368 | 6/1953 | Wallace et al. | 118/423 X |
| 3,063,409 | 11/1962 | Turner | 118/426 |
| 3,313,398 | 4/1967 | Andrews | 214/1 P X |
| 3,340,850 | 9/1967 | Elliott | 118/423 |
| 3,363,743 | 1/1968 | Pfeiffer | 198/41 |

*Primary Examiner*—Morris Kaplan
*Attorney*—Webb, Burden, Robinson & Webb

[57] ABSTRACT

An automatic processing line having a conveyor system continuously feeding workpieces to chain sinkers which lower the workpiece into a process area at a slope and raise the workpiece from the process area at a slope and a screw apparatus which removes the workpiece from the chain sinker in the process area and conveys it to a continuous dragout conveyor for removal.

9 Claims, 19 Drawing Figures

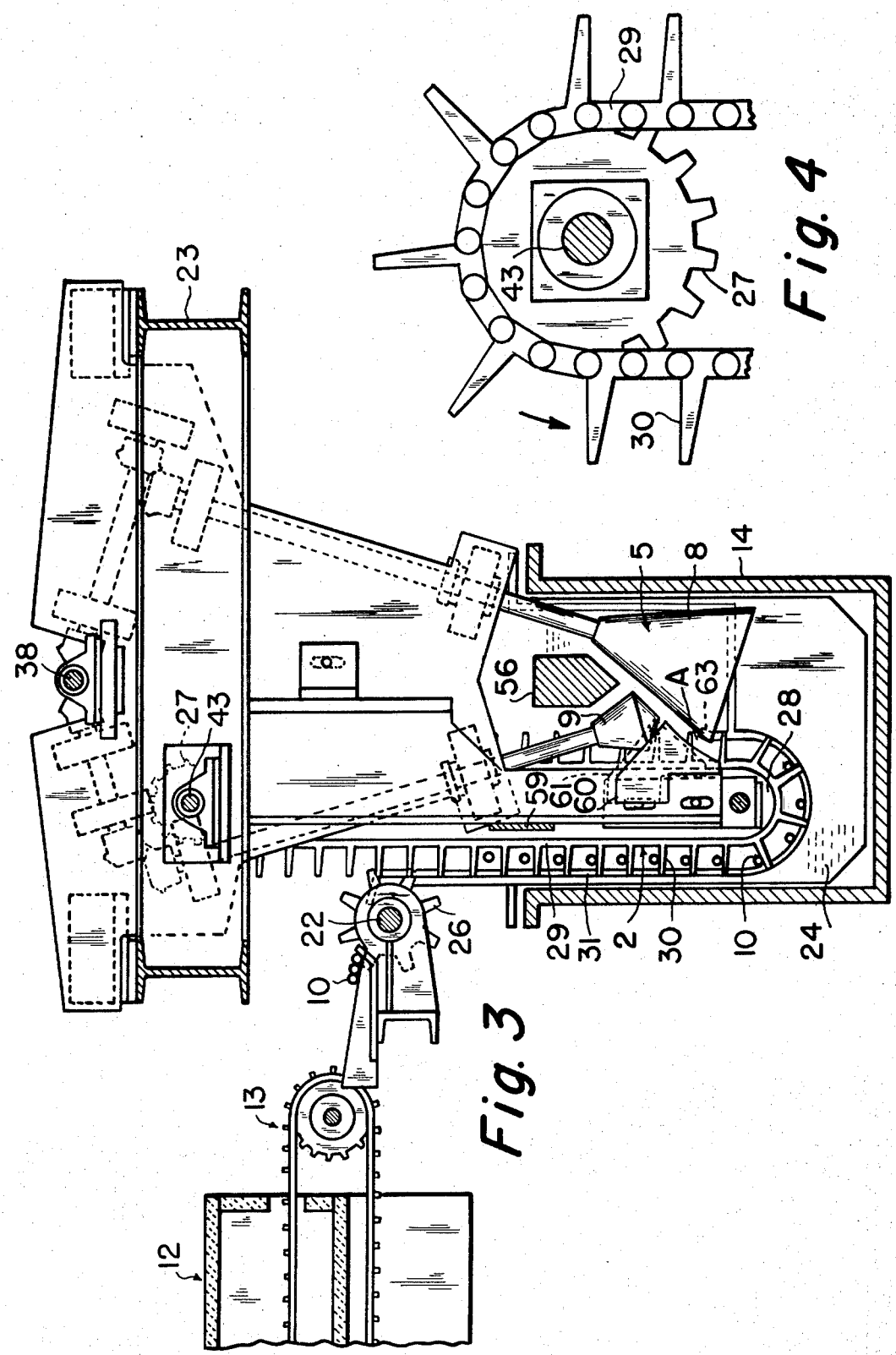

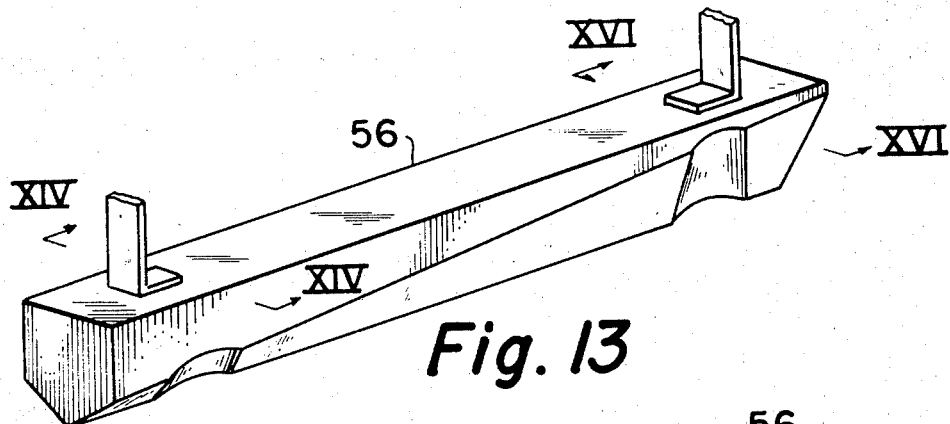
Fig. 13
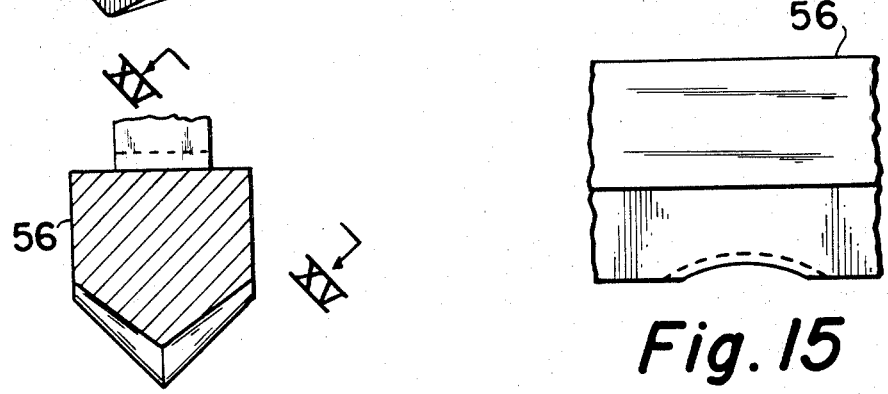
Fig. 14
Fig. 15
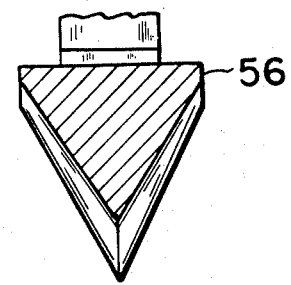
Fig. 16
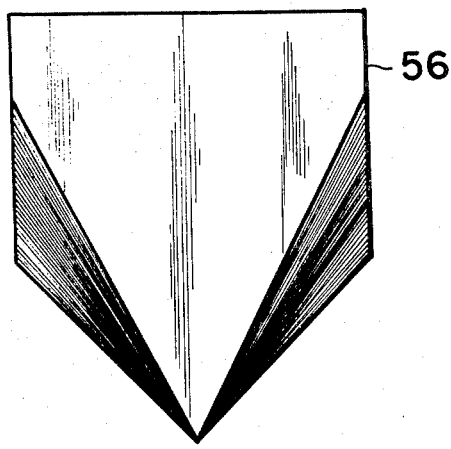
Fig. 17

3,701,336

PIPE COATING APPARATUS

This is a division of application Ser. No. 723,411, filed Apr. 23, 1968 and now Pat. No. 3,859,794.

Our invention relates to an automatic processing line for treating workpieces by either one of or a combination of metal coating, pickling cleaning with liquid or vapor, coating with paint, plastic, etc., by liquid or vapor or plating of any type. More particularly, our invention relates to an automatic metal coating apparatus for pipe and still more particularly our invention relates to an apparatus continuously conveying lengths of pipe into a molten zinc pot for continuous galvanizing and then removing them for further processing.

Our invention provides for the continuous controlled feeding of a workpiece through a process area in such manner that the first workpiece in is the first workpiece out. Because of this first in-first out principle, the process is very controllable for providing identical processing to an infinite number of successive workpieces. For example, where metal coating is the particular process, the length of time a workpiece remains in the process area can be kept constant for all successive workpieces resulting in a uniform coating weight for all the workpieces. In addition, our invention provides for lowering the workpiece into the process area at an angle with respect to the liquid or vapor bath therein contained for ease of liquid or vapor displacement and proper air venting. It also provides for reducing the inclination of the workpiece to zero at the bottom of the liquid or vapor bath for proper processing and then moving the workpiece angularly for removal from the bath so that the excess liquid will properly drain back into the bath. Our invention also provides an apparatus for easily removing the workpiece from the processing conveyor apparatus and delivering alternate workpieces to an alternate parallel system of dragout conveyors to then be conveyed for further processing. It also provides for continuously feeding just one of the alternate systems of dragout conveyors if for some reason it becomes necessary or desirous to not operate the other.

Various other features, objects, and advantages of the automatic processing apparatus will either be specifically pointed out or become apparent when, for a better understanding of the invention, reference is made to the following description taken in conjunction with the accompanying drawings illustrating a preferred embodiment of the invention.

In the drawings:

FIG. 3 is a schematic view taken along section lines III—III of FIG. 2, showing one sinker chain assembly and one screw roll assembly;

FIG. 4 shows a cutaway view of the upper portion of chain assembly 2;

FIG. 13 is an isometric of the elongated confinement guide;

FIG. 14 is a section taken along section lines XIV—XIV of FIG. 13;

FIG. 15 is a section taken along section lines XV—XV of FIG. 14;

FIG. 16 is a section taken along section lines XVI—XVI of FIG. 13;

FIG. 17 is an end view of FIG. 13, looking from the left end to the right end, showing the curvature of the sides which intersect to form the V-portion of the guide;

Figure 1:
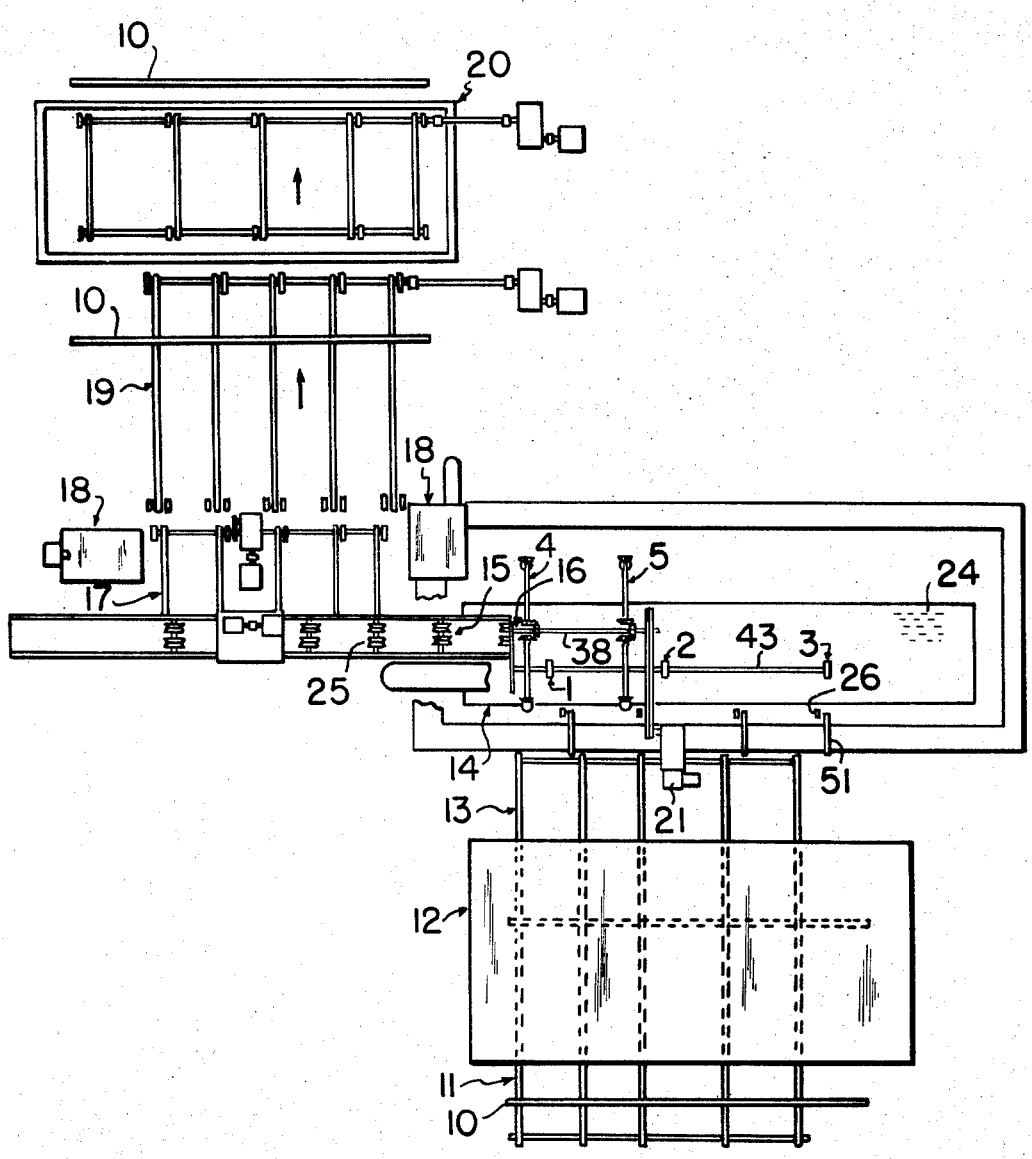
FIG. 1 is a schematic view showing the material flow and general arrangement of a galvanizing unit embodying our invention.

A schematic showing the general arrangement of a complete galvanizing unit embodying our invention is shown in FIG. 1. As can be seen, a cut length pipe 10 to be coated is placed in an entry conveyor 11. This cut length pipe could be any form of workpiece such as rods, conduit, bars, structural members, tubing, etc. The term workpiece as used herein describes any such length of pipe or any other equivalent which would be subjected to any of the various processes herein disclosed. The entry conveyor delivers the pipe into a preheat and drying furnace 12. This preheat and drying furnace could, of course, be any type of preparation station prior to a cleaning, pickling, coating, or plating operation. The pipe then feeds from a pick off 11 in the furnace 12 and onto an inclined delivery conveyor 13 which delivers the pipe to the coating pot 14 for galvanizing. The pick off 11 and the inclined feeder conveyor may be one continuous inclined conveyor through the furnace. As disclosed earlier, the process area can by of many types wherein a workpiece is to be treated by metal coating, pickling, cleaning with liquid or vapor, coating with paint, plastic, etc., by liquid or vapor or plating of any type. Our invention, shown in part in FIG. 1, relates particularly to the means for conveying the pipe from the delivery conveyor 13 into the zinc bath 24 and out of the path 24 to a dragout station 16. The coated pipe is conveyed by a dragout conveyor 15 from the dragout station 16 to another conveyor 17 running normal to the dragout conveyor 15. This conveyor 17 delivers the pipe to a blowout station 18 where all excess zinc is removed. From the blowout station 18, the pipe is conveyed by conveyor 19 to a cooling and bosh tank 20 which completes the galvanizing operation. A rust inhibiting chemical treatment such as the application of dichromate is often employed in the final stages of processing although such treatment is not shown in FIG. 1. These final process stations could be of any type compatible with the particular operation being performed. Motor 21 serves as the common drive means for all operations from the delivery conveyor to the dragout conveyor.

Figure 2:
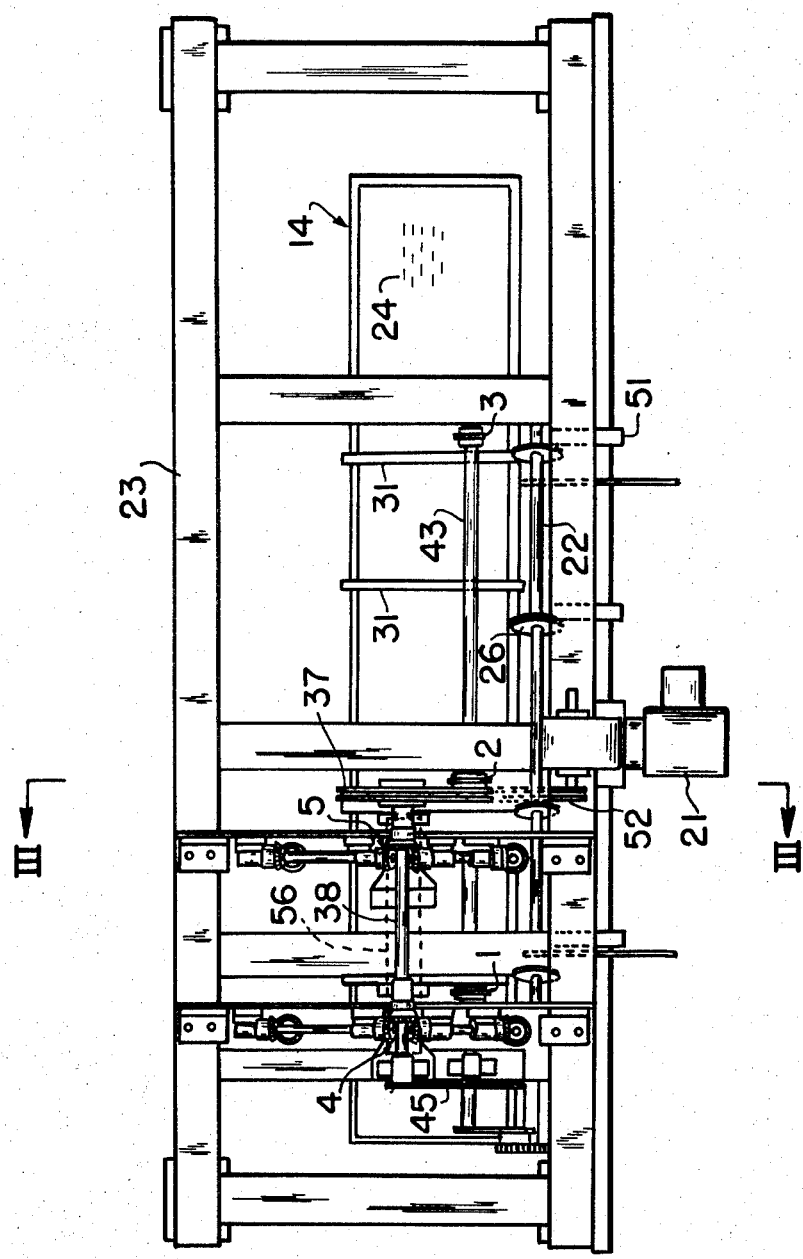
FIG. 2 is a plan view showing the general arrangement of a unit embodying our invention.

In our preferred embodiment there are three sinker chain assemblies 1, 2, and 3. The sinker chain assemblies, which are parallel and vertical, are spaced within the coating pot 14 and are aligned with the inclined delivery conveyor 13. Only the feed shaft 22 of the delivery conveyor is shown in FIG. 2. As will be seen later, the conveyor is positioned to feed the pipe from above the top of the coating pot 14. The two screw roll assemblies 4 and 5 are located immediately adjacent to sinker chain assemblies 1 and 2, respectively, with sinker chain assembly 1 being between the screw roll assemblies.

The relationship between a sinker chain assembly and a screw roll assembly can best be seen by referring to FIG. 3 which is a schematic view taken along lines III—III of FIG. 2 showing screw roll assembly 5 and sinker chain assembly 2. Each sinker chain assembly is individually mounted to the framework 23 located above the pot. As seen in FIG. 3, the chain assembly 2 extends from the framework 23 above the pot 14 downwardly into the metal bath 24 to a point near the bottom of the pot 14. As will be seen later, the sinker chain assemblies provide the means for transporting the pipe from the feed conveyor downwardly into the bath for coating and then upwardly for removal from the bath. The screw roll assembly 5, consisting of two aligned screw rolls 8 and 9, also extends from the framework 23 above the galvanizing pot 14 downwardly into the metal bath to a predetermined liftout point A where the pipe is removed from the sinker chain by the screw roll assembly. Immediately above and operably aligned with the two screw rolls is a magnetic dragout conveyor 25 (shown in FIG. 6) of the type well known to those skilled in the art and which is used for the endwise removal of the pipe from the screw roll assemblies 4 and 5 (only screw assembly 5 is shown in FIG. 3) and from the galvanizing pot 14. Although a magnetic dragout conveyor is employed in our preferred embodiment, any type of removal system may be employed which would be compatible with the particular process in operation. As will be discussed later, the starwheel 26, shown in FIG. 3, feeds the pipe onto the sinker chain assembly. The starwheel drive 22, the feeder conveyor 13, the sinker chain assemblies 1, 2, and 3 (only sinker chain assembly 2 shown in FIG. 3), and the screw roll assemblies 4 and 5 are all commonly driven in synchronization.

The components of a sinker chain assembly can best be seen by referring to FIGS. 3 and 4. Each assembly is comprised of an upper sprocket 27 and a lower sprocket 28 located at opposite ends of the assembly; a continuous chain 29 extending about the sprockets; a plurality of equally spaced separating dogs 30 extending from the continuous chain 29 and a fixed outer confinement strip 31 also called a saddle guide mounted to the pot 14 and extending from the top of the pot 14 to a predetermined liftout point A. As shown in the various figures, confinement strip 31 has a curvilinear configuration which basically follows the contour of a chain assembly.

Figure 5:
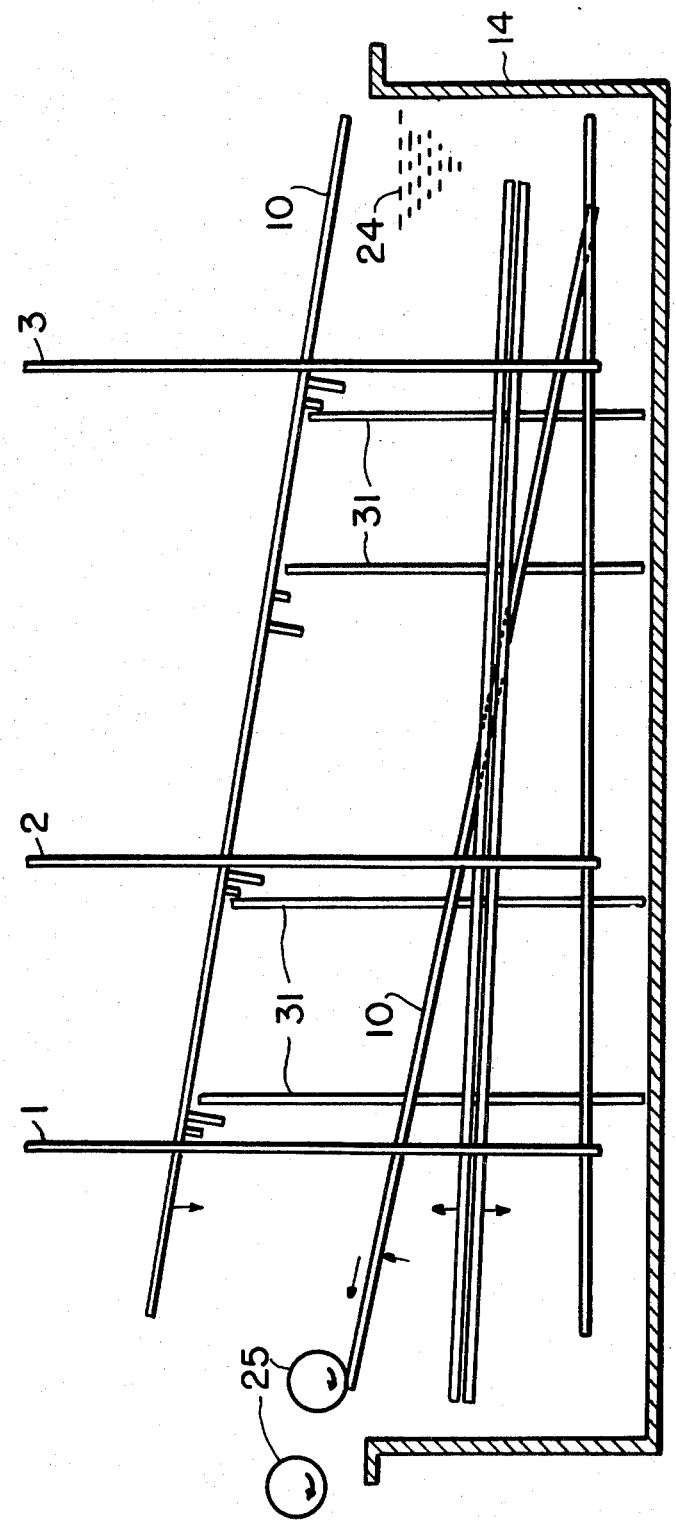
FIG. 5 is a schematic view showing the relative inclination of the pipe during ascent and during descent.

Each of the sinker chains, although commonly driven, operate at different speeds to accomplish a sloping and resloping of the pipe during its descent into the bath and its ascent from the bath. This is accomplished by varying the pitch diameter of the sprockets of the various chain assemblies. This then varies the respective diametral pitches. The total number of pitches of the chain are also varied accordingly. The revolutions per minute of the sprocket shafts are constant but the lineal speed of the chains varies with the pitch diameter of the sprocket. The result is that the chain of chain assembly 1 is driven faster than the chain of chain assembly 2 which, in turn, is driven faster than the chain of chain assembly 3, but all are driven in synchronization. The synchronization is such that the inclination of the pipe is reduced to zero at its bottommost point of travel and then resloped during its ascent to the liftout point. This is schematically shown in FIG. 5.

Figure 6:
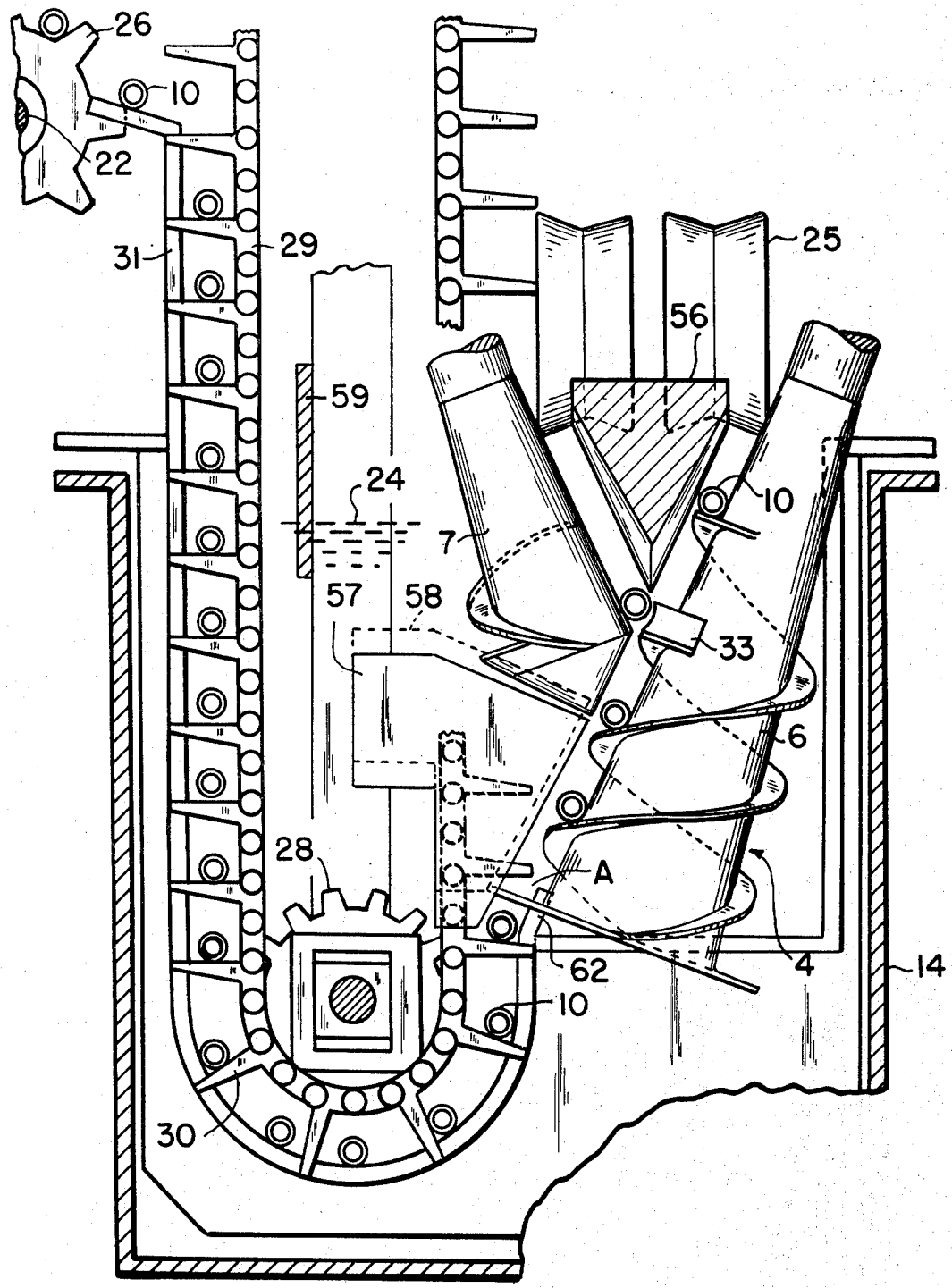
FIG. 6 is a section showing the movement of pipe on the screw roll assembly having the long flight.
Figure 7:
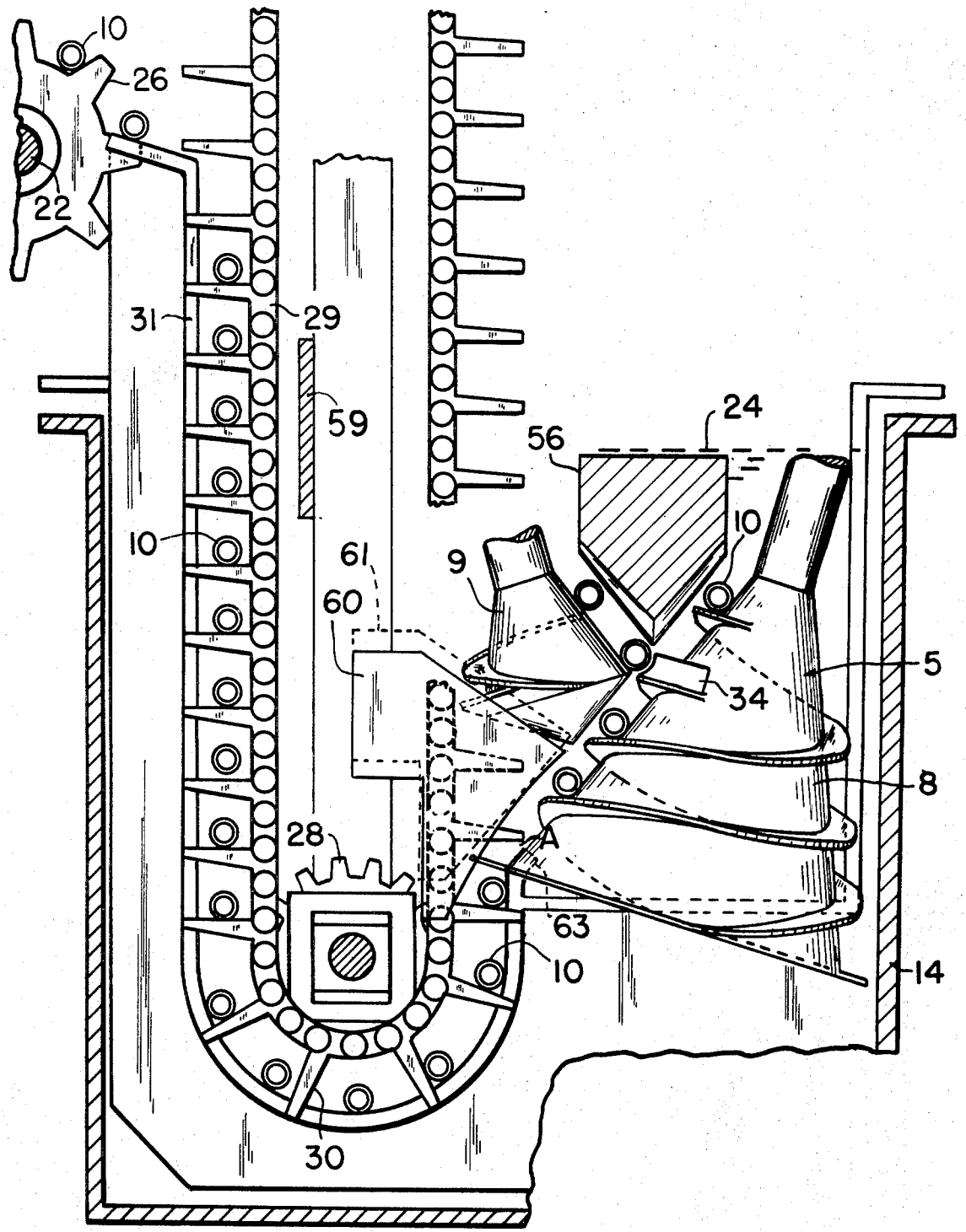
FIG. 7 is a section showing the movement of pipe on the screw roll assembly having the short flight.

The alignment of the parallel screw roll assemblies 4 and 5 to the sinker chain assemblies 1 and 2 can best be illustrated by referring to FIGS. 6 and 7. Each screw roll assembly 4 and 5 is aligned and adjacent to the lower end of the chain assembly at the predetermined liftout point A. Each screw roll assembly is comprised of two adjacent and offset screw rolls, 6 and 7 for screw roll assembly 4, and 8 and 9 for screw roll assembly 5. The screw rolls 6 and 8 which receive the pipe from the dogs 30 have a conical-shaped root and a variable double pitch flight. The variable double pitch flight as used herein describes a screw roll having a series of threads in two separate flights. The helix angle is always constant and thus the pitch is variable and decreases as the thread moves up toward the top of the cone root. As will be seen, one flight ends at a spiral contoured cam kickout where the pipe is transferred to the adjacent screw roll. The remaining flight continues above this transfer point and thus represents a single flight above this point. Of course, variations in flight design can be incorporated to accomplish the same result.

In the preferred embodiment, the longer screw rolls 6 and 8 of the respective screw roll assemblies 4 and 5 are positioned in relationship to the sinker chains so that the lowest threads of each of the double flights of the respective screw rolls are immediately below the liftout point A so that these respective lowest threads of the respective flights actually lift the pipe lengths from the dogs of the chain and then proceed to move the pipe lengths up the flight of the screw rolls. The adjacent and shorter screw rolls 7 and 9 which are offset from screw rolls 6 and 8, respectively, also have a conical-shaped root but each has only a single variable pitch flight.

Figure 9:
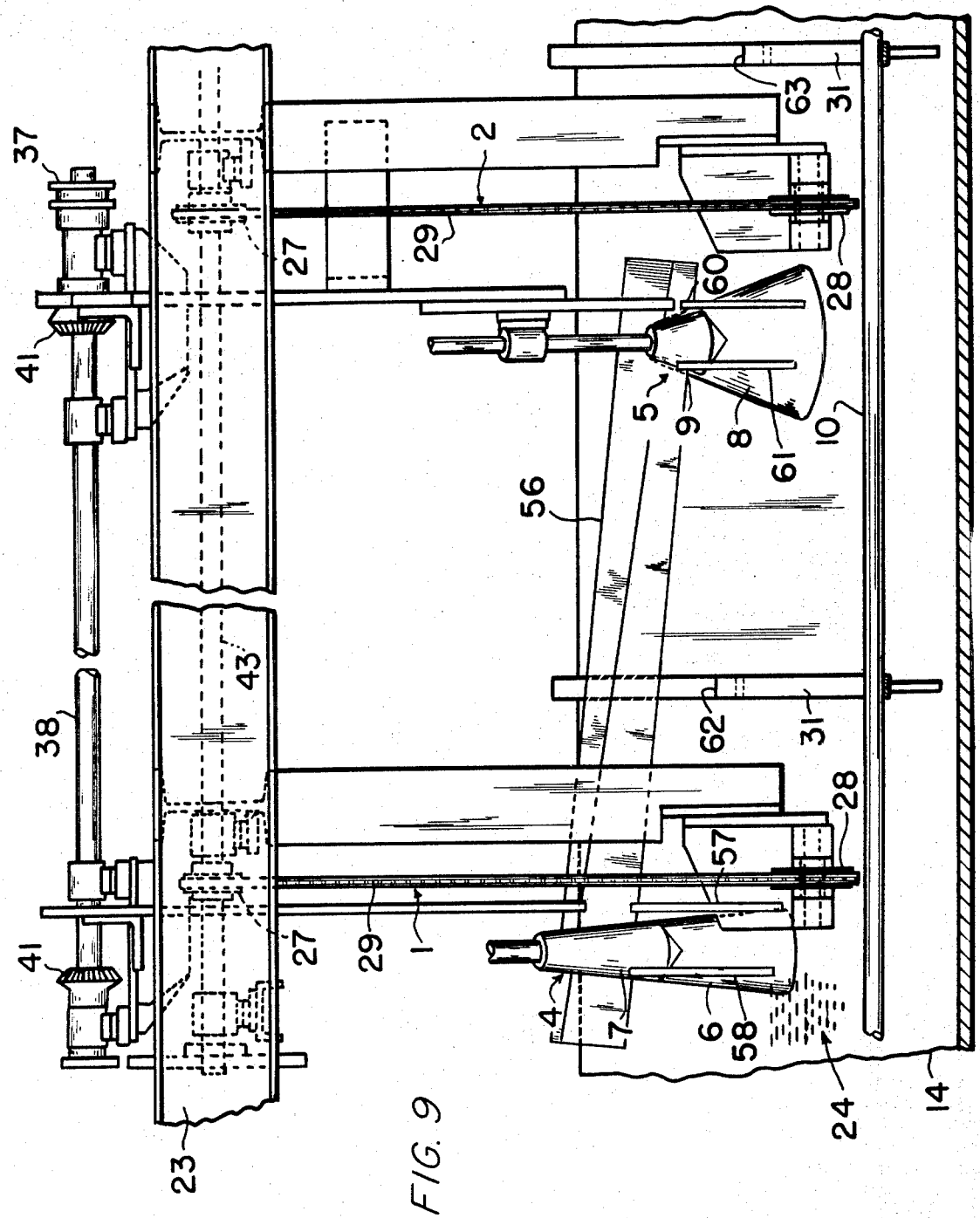
FIG. 9 is an elevation showing both screw roll assemblies.

The shorter flights of the screw rolls 6 and 8 end at spiral contoured cam kickouts 33 and 34, respectively. These kickouts represent the flights' ends and are spiral contour shaped to conform to the largest pipe diameter to be employed. At this kickout, the pipe is transferred to the adjacent screw rolls 7 and 9, having a single flight which then moves the pipe along its flight. The longer flight of screw rolls 6 and 8 bypass the transfer point where screw rolls 7 and 9 receive the pipe and thus continue the pipe along their own flight. Because the pipe is inclined at the liftout point A, one screw roll assembly is positioned higher in the bath than the other. This can best be seen by referring to FIG. 9. This then allows for the inclined pipe to be received simultaneously by the two screw roll assemblies. In addition, the pitches of the flights of the screw rolls of assembly 4 are greater than their respective pitches of the screw rolls of assembly 5. Since they are commonly driven, the speed of ascent varies depending on the pitch. The pitches of the flights are synchronized such that screw roll 6 receiving the upper end of the pipe moves faster than the screw roll 8 receiving the lower end of the pipe. This then increases the inclination over that which was present on the sinker chain at the time of removal. The purpose for this is to allow for better drainage of the molten zinc as it leaves the molten bath 24.

In FIG. 6 and FIG. 7, a flux baffle plate 59 which is standard equipment in a coating pot for molten zinc is shown. The only purpose of showing it is to indicate the ease an operator has in seeing the flux level on the flux baffle plate with our preferred embodiment.

A single elongated top confinement guide 56 which extends above and between the screw roll assemblies 4 and 5 serves as a guide for the pipe as they move up the single flight screw rolls 7 and 9 and up the single portion of the double flight screw rolls 6 and 8. The placement of the top confinement guide can be seen in FIG. 2. An isometric of the confinement guide is shown in FIG. 13. The sections shown in FIG. 14 and FIG. 16 show the V-shape of the bottom of the guide. FIG. 15, which is also a section, shows the recess which allows the free movement of the threads of the screw rolls. FIG. 17, which is an end view looking from the left end to the right end of FIG. 13, shows the curvature of the sides which intersect to the V-portion of the guide. The curvature of the sides of the confinement guide as shown in FIG. 17 will properly confine pipe from one-half inch through 2 inches I.P.S. (Iron Pipe Sizes). The confinement guide then forms a guide path for the pipe as it moves up the screw rolls for delivery to alternate dragout conveyors.

In addition to the single elongated confinement guide 56, there are additional guides in the coating pot 14 and within the bath 24. Two such guides 57 and 58 are shown in FIG. 6 for screw roll assembly 4 and two more guides 60 and 61 are shown in FIG. 7 for screw roll assembly 5. All four guides are contoured in shape as shown. They act as additional confinement guides for the travel of the pipe. The guides 57 and 58 are placed on either side of screw roll assembly 4 whereas guides 60 and 61 are placed on either side of screw roll assembly 5. This manner of guide placement reenforces the guide path of the pipe and eliminates any possibility of unrestricted travel of the pipe.

Three of the four outer confinement strips 31 which form a part of the traveling compartments for the pipe add additional confinement at the liftout point A by means of a contoured lip on which the pipe travels during removal. The size and contour of the lip differs for each outer confinement guide as shown for lip 62 in FIG. 6 and lip 63 in FIG. 7. Referring to FIG. 5, the third confinement strip 31 from the exit end of the pot 14 which is the only confinement strip not immediately adjacent a sinker chain assembly does not have a lip at the liftout point. The reason is that that particular confinement strip is positioned at the pivotal point of the pipe, and the pipe actually has no lateral movement at that point. That is, as the pipe is removed from the sinker chains, it no longer is exactly parallel to the sides of the coating pot 14 and the confinement strip 31 without the lip is at that point about which the pipe pivots.

Figure 8:
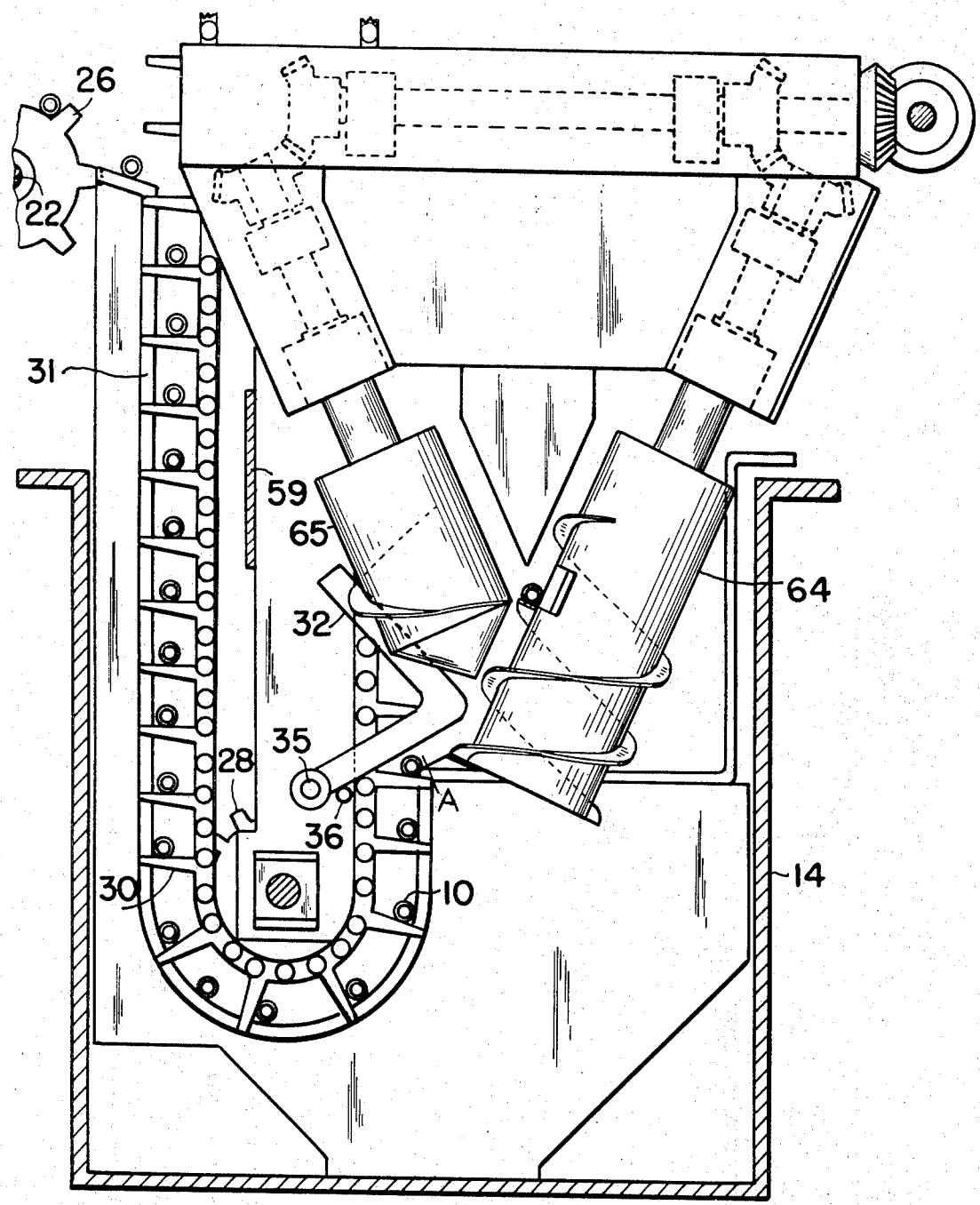
FIG. 8 is a section showing an alternative screw roll assembly comprised of straight rolls.

While the preferred embodiment shows conical-shaped screws, they are not absolutely necessary and the screws may be of various shapes such as curved or straight or combinations thereof. FIG. 8 shows an embodiment of the invention wherein the respective screw rolls 64 and 65 have straight roots rather than conical shaped. The straight rolls perform the same function and differ merely in physical shape.

An advantage of the conical root is that the conical shape takes up less space than a cylindrical root and, therefore, a smaller coating pot can be employed.

A screw roll assembly similar to that shown in FIG. 8 or the preferred embodiments could be employed having only single screw rolls with single or double flights. Two such assemblies could then be employed as a removal mechanism in a manner similar to that heretofore discussed.

Note that an alternate method of removing the pipe from the chain assembly to the screw assembly is also presented in FIG. 8. Here a deflector plate 32 is shown pivotably mounted about pin 35 which attaches by suitable means to a chain assembly. The stop pin 36 limits the downward movement of the deflector plate 32 and thus keeps it in proper position to deflect pipe. It has been found that where two screw roll assemblies are employed, the preferred embodiment method of removing the pipe at the liftout point is superior to the deflector plate method of removing the pipe. However, the experiments run using two deflector plates and two screw roll assemblies indicated that the deflector plate method of removal would be quite satisfactory when used with a single screw roll assembly.

There are a number of equivalent ways of guiding the pipe up the screw rolls into the dragout conveyor. A series of guide plates can perform the same function as the continuous elongated confinement guide 56. These guide plates would extend downwardly from support members of the framework. The guide plates should have the same V-type shape that the bottom portion of guide 56 has. If the outside diameters of the pipes employed in the process vary over wide ranges, the vertical guide plates can be made adjustable by any convenient method known to those skilled in the art to provide the proper size guide path.

Figure 10:
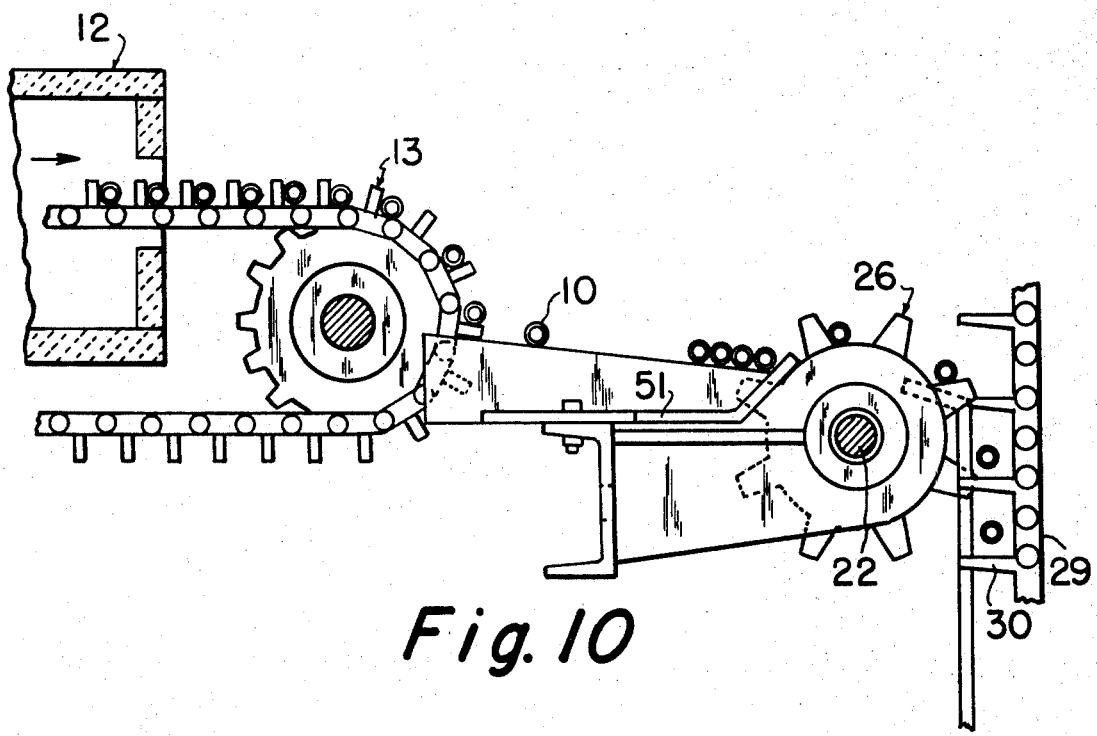
FIG. 10 is an elevation showing the feeding of pipe from the starwheel onto a sinker chain.
Figure 11:
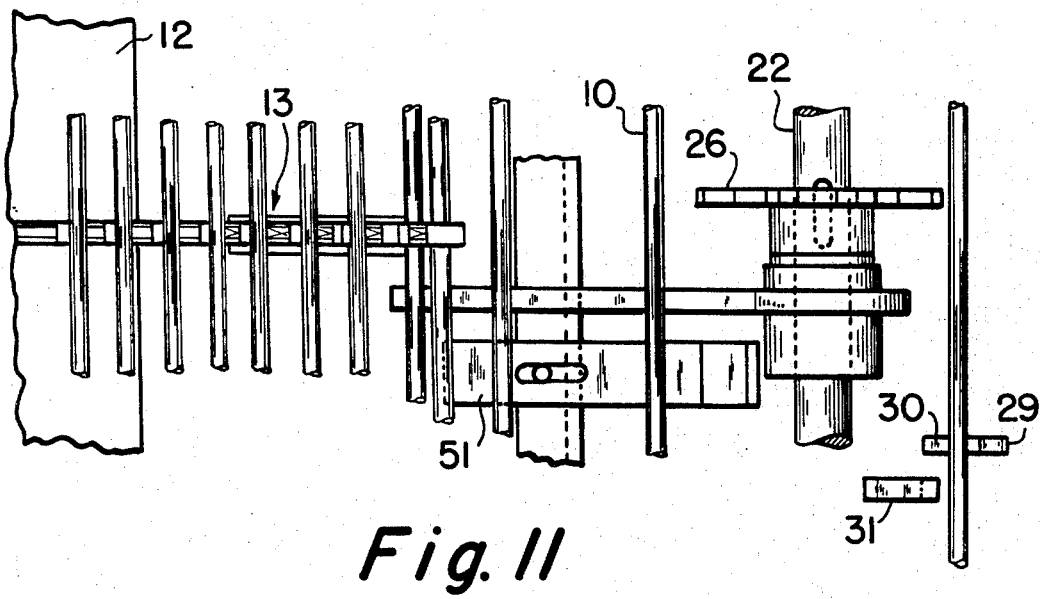
FIG. 11 is a plan of FIG. 10.

FIGS. 10 and 11 show the arrangement of the feeder conveyor 13 as it is placing pipe on the starwheel 26 for subsequent placing onto the dogs 30 of a chain 29 of one of the sinker chain assemblies. The starwheel 26, which is one of four identical starwheels as shown in FIG. 2, places one pipe at a time onto the downwardly moving dogs of the chain. The starwheels are fed pipe by feeder conveyor 13 which is a chain conveyor having moving separating dogs. Such chain type conveyors are common to those skilled in the art. Lug 51 is adjustable for different size pipe to control that only one pipe at a time is fed onto starwheels 26. The starwheels and the feeder conveyor 13 are also driven in synchronization with the chain assemblies and the screw roll assemblies to allow for proper timing in the placement of the pipe for coating.

Figure 12:
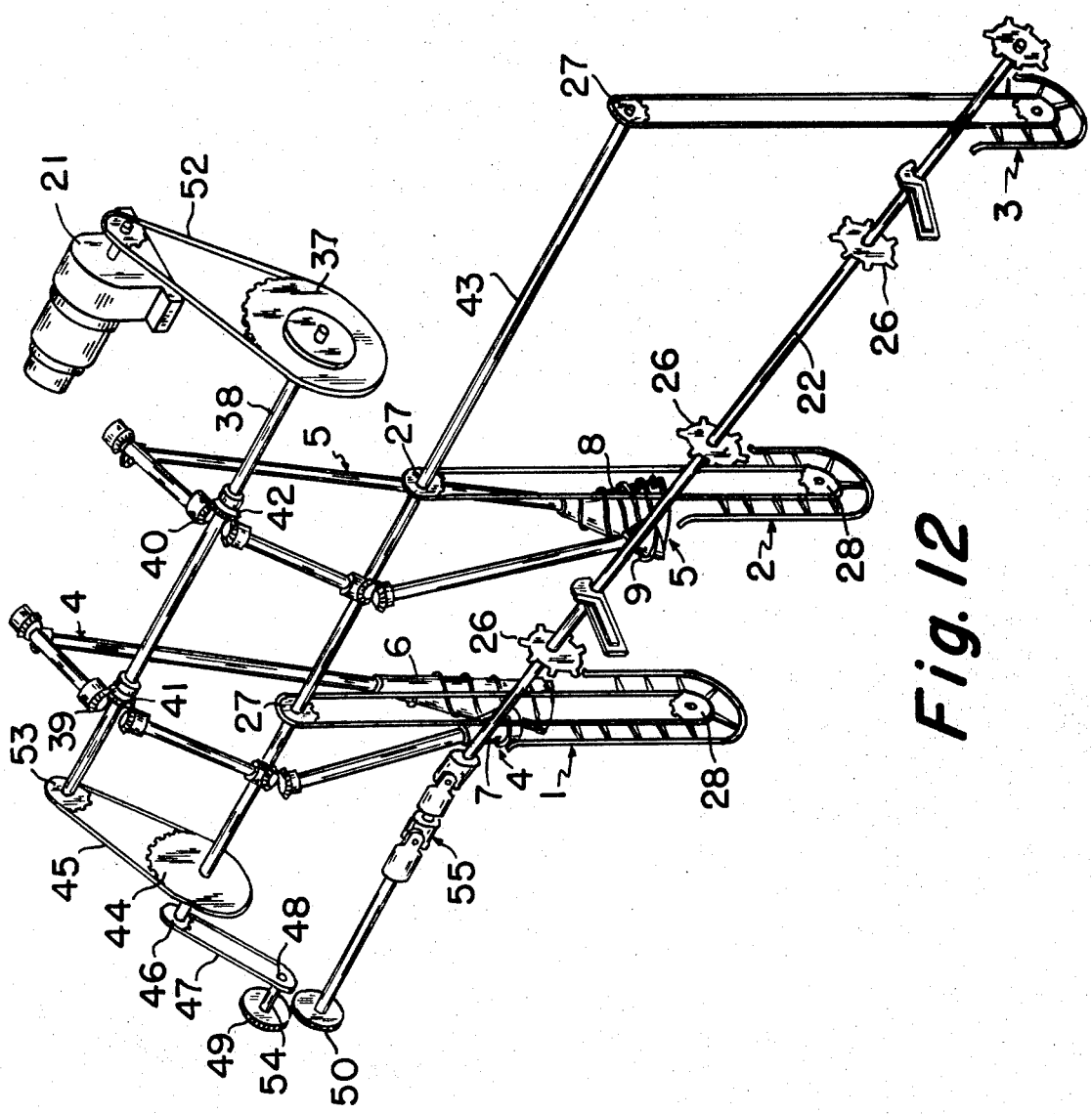
FIG. 12 is an isometric of the common drive means.

FIG. 12 shows the drive means. While the drive means is mechanically synchronized through variable speed motor 21, it is apparent that the individual units could be separately driven and still operated in synchronization by electrical means well known to those skilled in art. Note that FIG. 12 shows only the feed shaft 22, the screw roll assemblies 4 and 5 and the sinker chain assemblies 1, 2, and 3 driven in synchronization. By similar means, the feeder conveyor and dragout means can also be driven by motor 21. FIG. 12 shows variable speed motor 21 operably attached to shaft 38 by means of sprocket 37 and chain 52. Shaft 38 drives screw roll assemblies 4 and 5 by means of operably adjacent sets of bevel gears 39 and 41 and 41 and 42, respectively. Shaft 38, in turn, is operably connected to shaft 43 by means of sprockets 53 and 44 and chain 45. Shaft 43 has affixed thereto the upper sprockets 27 of the three sinker chain assemblies 1, 2, and 3. Therefore, as shaft 43 is driven by motor 21, so are the sinker chain assemblies. Shaft 43 is, in turn, operably connected to feed shaft 22 containing the starwheels 26 by means of sprockets 46 and 48 and chain 47. Sprocket 48 is attached to one end of shaft 54 and spur gear 49 is attached to the other end. Operably adjacent spur gear 49 is spur gear 50 which is attached to the end of feeder shaft 22. Feeder shaft 22 which contains universal joint 55 has affixed thereto the starwheels 26 which feed the sinker chains.

In addition to the preferred embodiment of our invention, there are a number of equivalent ways to continuously feed workpieces into and out of a process area and maintain the principle of first in-first out. Two other means of doing this are shown in the embodiments represented by FIG. 18 and FIG. 19.

Figure 18:
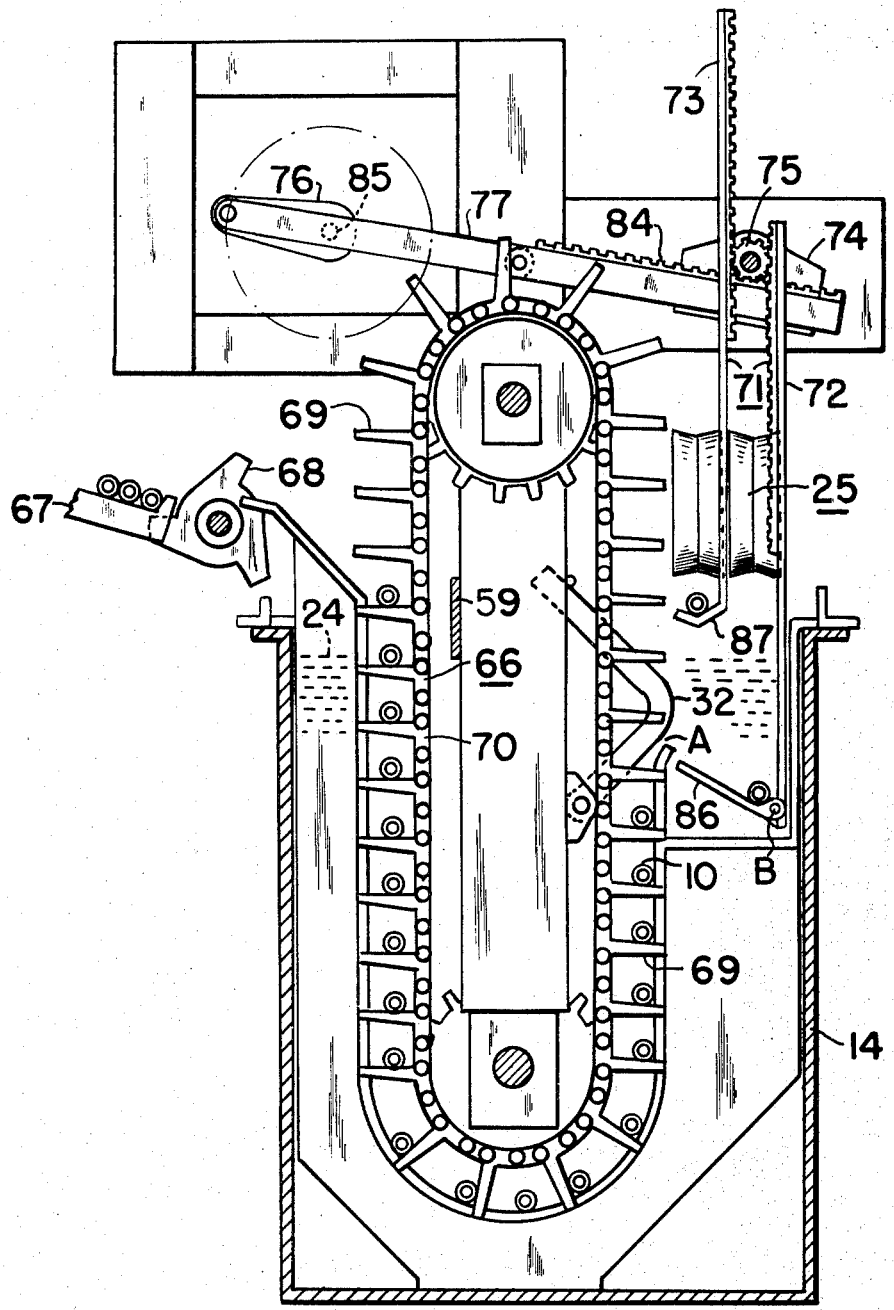
FIG. 18 is a schematic view of a sinker assembly and a reciprocating cradle assembly.

In FIG. 18, the sinker chain assembly 66 is identical to the sinker chain assemblies in the preferred embodiment. While only one such sinker chain assembly is shown, it is to be understood that more than one sinker chain assembly is present as in the preferred embodiment. Of course, the sinker chains operate at different speeds via different chain pitches to obtain the sloping and resloping. The particular feed mechanism 67 is comprised of a series of synchronized feed wheels 68 which place the sloped pipe onto the dogs 69 of the chains 70 in a manner similar to the preferred embodiment.

The means for removing the workpiece from the sinker chains is comprised of a series of parallel and aligned reciprocating cradle assemblies 71 rather than two screw roll assemblies. Each cradle assembly extends downwardly from above the bath and is comprised of two parallel cradle arms 72 and 73 which have at their lower ends the actual cradles 86 and 87, respectively.

The upper ends of the cradle arms 72 and 73 form racks which are operatively meshed to stationary pinion 75. The pinion 75 is suitably mounted to the frame support 74. The pinion 75 is driven by rack 84 which is connected to drive link 76 by means of connecting arm 77. Drive link 76 is driven by shaft 85 which connects to the drive motor (not shown). The rotation of shaft 85 causes a cam-like movement in drive link 76. This, in turn, causes a substantially horizontal reciprocating movement of rack 84 which, in turn, is transferred to a substantially vertical reciprocating movement of cradle arms 72 and 73 through pinion 75.

The reciprocation is such that the lowest point of travel of an individual cradle is calculated to occur at the predetermined liftout point A. The cradle portion of the cradle arms arrives at this position at the same time a pipe is being deflected from the chain dogs 69 by a hinged deflector plate 32. The corresponding cradles of the other cradle assembly are likewise simultaneously receiving the pipe. Since the pipe is sloped at the removal point, the relative heights of the corresponding cradles of the cradle assemblies with respect to the bottom of the coating pot are in the same relationship as the inclination of the pipe so that the pipe is received simultaneously by all corresponding cradles. The cradle 86 of cradle arm 72 which is longer than the cradle 87 of cradle arm 73 is pivotably mounted to cradle arm 72 at point B by any suitable means. Therefore, as the cradle 87 is carrying pipe upward, cradle 86 which is being lowered pivots about point B when it contacts the ascending pipe and thus allows the pipe to continue upward unobstructed. When a pipe is placed on cradle 86 which is sloped toward pivot point B, the pipe is conveyed out of the path of travel of cradle 87. As the pipe is being raised in corresponding cradles of the series of cradle assemblies, the remaining corresponding cradles are being lowered to receive the next pipe in the same manner. The pipe is then endwise removed from the cradle arms at the uppermost point of travel by any type of removal means, an example being the multiple parallel roll magnetic dragout conveyor 25 as employed in the preferred embodiment.

Figure 19:
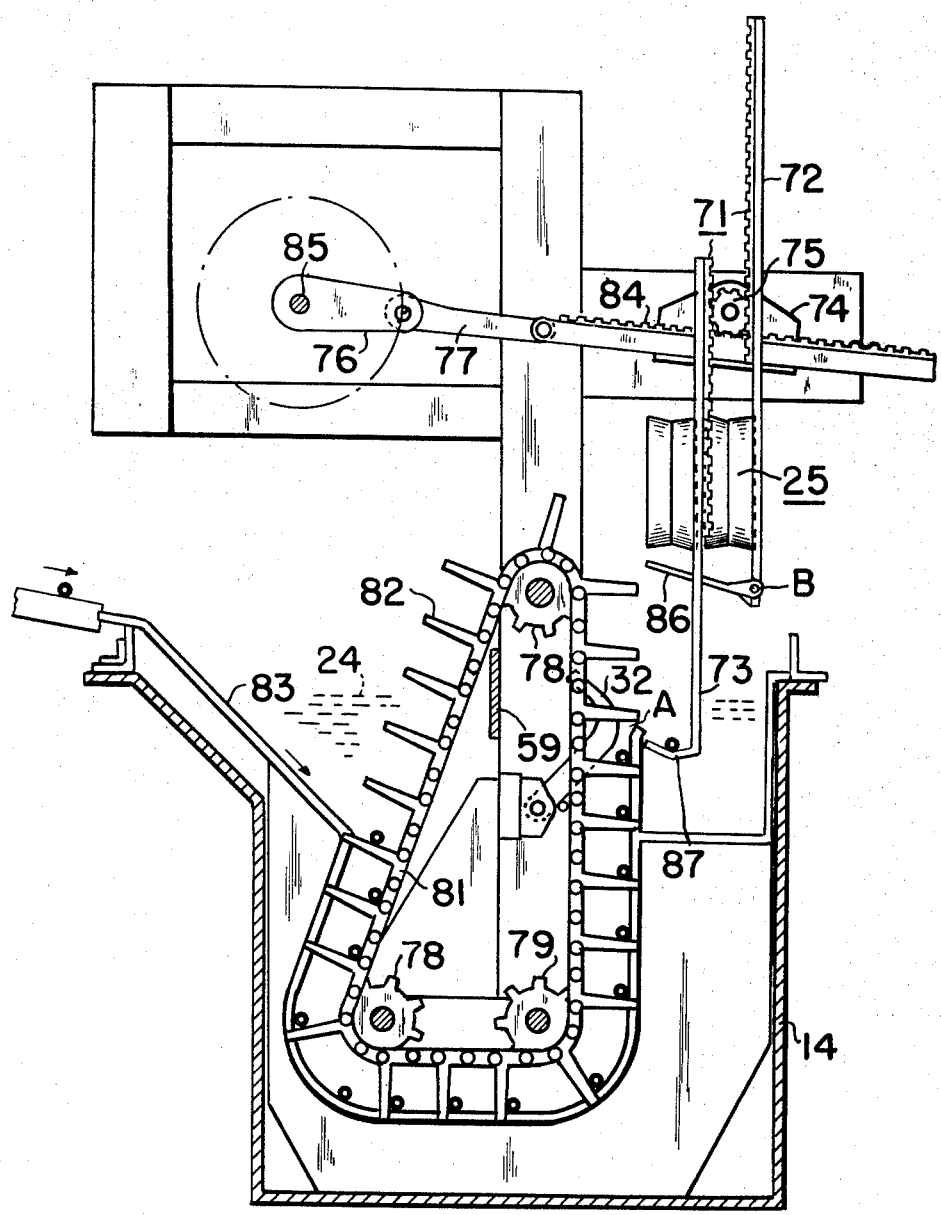
FIG. 19 is a schematic view of a treble sprocket sinker chain assembly and a reciprocating cradle assembly.

FIG. 19 shows a third embodiment of our invention which also performs the processing operation to insure the principle of first in-first out. In this embodiment, each sinker chain assembly is designed in the form of a right triangle. That is, instead of two sprockets in a vertical plane around which travels a continuous chain having dogs, there are three such sprockets 78, 79, and 80 with sprockets 78 and 79 in the same vertical plane and 79 and 80 in the same horizontal plane. Because of the angularity of the entry side of the sinker chain, the traveling compartments formed by the chain 81 and any two adjacent dogs 82 slant upwardly. This enables one to manually or mechanically feed the pipe into the traveling compartment by merely sliding or pushing the pipe 10 on skids 83 from the entry conveyor. Of course, as in the other embodiments, curvilinear confinement strips which can be continuations of skids 83 complete the traveling compartments during movement through the bath. For purposes of completeness, a reciprocating cradle assembly, as previously described in FIG. 14, is shown as the removal means from the sinker chain.

It must be realized that where three sprockets are employed in a single chain assembly regardless of whether they are at right angles or in some other configuration, the rate of inclination of the pipe as controlled via different pitches of the sinker chains will be limited. This limitation will not be applicable to the extent that the pipe can be freely conveyed around any corner formed by the triangular configuration.

The two sprocket chain assembly does not have this limitation and, therefore, this pipe can generally be inclined at a greater slope for better ease of entry and exit from the liquid bath.

The principle of first in-first out can also be employed without the benefit of either the screw roll assemblies or the reciprocating cradle assemblies. This is accomplished by merely not having the aforementioned removal means and manually removing the pipe lengths from the sinker chain assemblies after coating and after the chain assemblies themselves have conveyed the pipe out of the metal bath.

The operation of the preferred embodiment is as follows:

Cut length pipe 10 are deposited singly on inclined chain table conveyor 11 having spaced separating dogs. Chain table conveyor 11 conveys the pipe through a drying and preheating furnace 12. The pipe are discharged from the furnace from chain table conveyor 11 to chain table conveyor 13 also having spaced separating dogs. Chain table conveyor 13 is also inclined and thus conveys the cut pipe at a predetermined inclination to the starwheel arrangement of FIG. 10. The starwheels feed the pipe simultaneously to the dogs 30 of each of the three sinker chain apparatus 1, 2, and 3. The sinker chains, each of which has a different pitch for different synchronized lineal chain speeds, are provided with spaced dogs 30 which, together with fixed outer confinement strips 31, form traveling compartments for conveying individual lengths of pipe into the molten zinc suitably inclined to allow proper metal displacement and proper venting of air. These compartments assist in moving the pipe into the molten zinc which is slightly less dense than the steel pipe. Because of the different synchronized lineal speeds of the three sinker chains, the inclination of the pipe is reduced to zero as the sinker chains feed the pipe to its lowest depth. Again, because of the different synchronized lineal chain speeds, the pipe is resloped as it is fed away from its lowest point and toward its liftout point A.

At the predetermined liftout point A, the pipe is engaged by the lowest portion of the threads of the flights of screw rolls 6 and 8 which remove the pipe from the sinker chains and proceed to move the pipe along the flights of the screw rolls. The confinement of fixed outer confinement strip 31 is also ended at the liftout point A. A guide path is formed by the confinement strip 31, the upper lip, e.g., 62, of the confinement strip and lower deflector guides 57, 58, 60 and 61. This guide path properly restricts the movement of the pipe 10.

The receiving portion of screw roll 6 is positioned higher than the receiving portion of screw assembly 8 by a distance which allows both assemblies to receive the inclined pipe simultaneously. Each assembly (4 and 5), as shown earlier, has the receiving screw rolls (6 and 8, respectively) with variable double pitched flights and the adjacent offset screw rolls (7 and 9, respectively) with a single flight. When a cut length of pipe is placed on the shorter of the two flights of screw rolls 6 and 8, it is moved up the flight to a predetermined point at which time the pipe is transferred to the flight of the adjacent aligned screw rolls 7 and 9, by means of spiral contoured cam kickouts 33 and 34 which form the ends of the shorter flights of the double flight screw rolls 6 and 8, respectively. The single flight screw rolls 7 and 9 continue to move the pipe both vertically and laterally until the pipe is brought into alignment with and under one of two parallel multiple rolls which form the start of the magnetic dragout 25. These rolls are continuous rotating, inclined magnetic dragout conveyors, well known to those skilled in the art, which remove the pipe from the screw rolls and the molten zinc baths by endwise motion. Since the respective pitches of the flights of the screw roll assemblies are different, as shown and discussed for FIGS. 6 and 7, the inclination of the pipe is appreciably increased for better drainage as it leaves the metal bath.

Similarly, when the cut length is placed onto the longer of the two flights of screw rolls 6 and 8, the pipe is not transferred, but instead is moved vertically and laterally until the pipe is moved to the second row of the parallel dragout conveyor rolls which form part of magnetic dragout 25. The pipe length regardless of which flight it travels in is always guided by the single elongated confinement guide 56.

It should be noted that the movement of the pipe with respect to each other in the coating pot is always parallel and longitudinal excepting minor endwise surges due to buoyancy effects. As such, there is no substantial endwise movement until the pipe is removed by the dragout rolls.

It can, therefore, be seen that if a cut length of pipe is placed in each chain pocket at the entry of the furnace, which will thus feed each chain pocket of the sinker chains, pipe will be discharged alternately at the two parallel dragout rolls of magnetic dragout 25. When pipe are loaded in every other pocket, the pipe will be removed by only one of the dragout conveyors.

While we have herein shown and described a preferred embodiment of our invention, it is recognized that departures may be made therefrom but that the invention will be accorded the full scope of the claims so as to embrace any and all equivalent devices.

We claim:

1. In a metal coating line for continuously coating lengths of pipe in a pot containing a bath of molten metal by the lateral movement from a conveying means at a preparation station to the bath and subsequently to conveying means for delivery to a finishing station, the improvement comprising:

A. Transfer means at the preparation station for accepting and inclining metal pipe lengths; and
   B. Sinker means adjacent to the transfer means and extending substantially vertically from above the bath into the bath and having an operable transport means to continuously receive inclined pipe lengths from the transfer means, and convey pipe downwardly into the molten bath and upwardly for removal from the bath.

2. The apparatus of claim 1 wherein the sinker means comprises at least two spaced, parallel, and aligned chain assemblies operated in synchronization by a drive means such that when a lower end of the inclined pipe is received by a dog of one chain assembly, an upper end of the inclined pipe is simultaneously received by a dog of another chain assembly; the synchronized chain assemblies operating such that the chain transporting the upper end of the pipe is traveling faster than the chain transporting the lower end so that the pipe is still inclined when it enters the bath, the inclination being reduced to zero at a lowermost point of travel and the pipe being resloped during ascent, the pipe being held in place by traveling compartments formed by a chain, adjacent dogs, and a fixed outer confinement strip.

3. In a metal coating line for continuously coating lengths of pipe in a pot containing a bath of molten metal by the lateral movement from a conveying means at a preparation station to the molten bath and subsequently to a dragout means for delivery to a finishing station, the improvement comprising:

A. Transfer means at the preparation station for accepting and inclining metal pipe;

B. Sinker means adjacent to the transfer means and extending substantially vertically from above the bath into the bath and having an operable transport means to continuously receive inclined pipe from the transfer means, and convey pipe downwardly into the bath and upwardly for removal from the bath; and C. Screw means positioned adjacent to the lower end of the sinker means and having a first conveying section extending within the bath to receive the coated pipe from the transport means and at least a second conveying section extending from the bath to a dragout means for subsequent delivery to a finishing station.

4. The apparatus of claim 3 wherein the sinker means comprises at least two spaced, parallel, and aligned chain assemblies operated in synchronization by a drive means such that when a lower end of the inclined pipe is received by a dog of one chain assembly, an upper end of the inclined pipe is simultaneously received by a dog of another chain assembly; the synchronized chain assemblies operating such that the chain transporting the upper end of the pipe is traveling faster than the chain transporting the lower end so that the pipe is still inclined when it enters the bath, the inclination being reduced to zero at a lowermost point of travel and the pipe being resloped during ascent, the pipe being held in place by traveling compartments formed by a chain, adjacent dogs, and a fixed outer confinement strip.

5. The apparatus of claim 3 wherein the screw means comprises at least two spaced and aligned, synchronized screw roll assemblies positioned to receive simultaneously an inclined pipe, each screw roll assembly including at least a first screw roll and a second offset screw roll wherein the first screw roll has at least a first and second flight having a portion of the flights immediately adjacent the sinker means for removing the pipe from the sinker means and the second screw roll has at least a single flight for receiving pipe from at least one flight of the first screw roll.

6. The apparatus of claim 3, wherein the screw means is a removal means comprising at least two parallel cradle assemblies, each assembly having two parallel reciprocating cradle arms with cradles extending therefrom, said assemblies operated in synchronization such that corresponding cradles of the parallel assemblies receive the pipe between its ends simultaneously from the sinker means and deliver the workpiece to the dragout means.

7. In a metal coating line for continuously coating lengths of pipe in a pot containing a bath of molten metal, wherein pipe lengths to be coated are laterally moved from a preheat and drying furnace to the pot and coated pipe lengths from the pot are conveyed to finishing stations, apparatus comprising:

A. An inclined chain conveyor table having spaced separating dogs for accepting pipe lengths and for conveying the inclined pipe lengths to three sinker chain assemblies;

B. Three spaced vertically disposed parallel and aligned commonly driven sinker chain assemblies for receiving and conveying the inclined pipe lengths; each assembly being separately supported and being adjacent the chain conveyor table and extending from above the bath into the bath and comprised of two sprockets located at opposite ends of the assembly with the upper sprocket operated by a drive means, a continuous chain extending about the sprockets, a plurality of spaced separating dogs extending from the continuous chain, and a fixed outer confinement strip mounted to the pot and extending from substantially the top of the pot to a predetermined removal point; the three sinker chain assemblies being synchronized by differences in chain pitches such that when the dogs receive the inclined pipe, the chains move to allow a reduction in the inclination of the pipe during its descent into the bath to an inclination of zero at a bottommost point of travel in the bath and a resloping of the pipe during ascent from the bath, said pipe retained in each chain assembly by traveling compartments comprising the chain, any two adjacent dogs and the outer confinement stripe;

C. Two parallel and aligned screw roll assemblies spaced adjacent the lower end of two chain assemblies; each screw roll assembly having two adjacent offset screw rolls wherein one screw roll has a conical root and variable double pitch flights having the lowest portion of the flights immediately adjacent the two chain assemblies for removing the pipe from the chain assembly and which will upon removing the pipe length on a longer flight, convey it vertically and laterally and which will upon removing the pipe length on a shorter flight convey it to a spiral contoured end of the flight for transfer to the adjacent screw roll having a conical root and a variable single pitch flight for receiving the pipe length and for also conveying it vertically and laterally in a plane parallel that of the longer flight; the screw roll assemblies being synchronized to receive simultaneously the resloped pipe length between its ends and having different pitches for corresponding flights so that the upper end of the pipe length will ascend faster than the lower end resulting in an increased inclination of the pipe length during its ascent; and D. A double row of parallel multiple continuous rotating inclined magnetic dragout rolls having the first row of rolls aligned with and above the alternate planes of travel of the pipe lengths on the screw rolls, for endwise removal of the pipe lengths from the screw rolls and the bath for delivery to the finishing stations.

8. An apparatus in a continuous process line for receiving inclined elongated workpieces and conveying them downwardly into and upwardly from a process area, comprising at least two spaced, parallel and aligned chain assemblies, each chain assembly having sprocket means located at opposite ends of the assembly, a continuous chain extending about the sprocket means, a plurality of spaced separating dogs extending from the continuous chain, and a fixed outer confinement strip suitably mounted from a point of entry of the workpiece and extending to a point of exit of the workpiece; the chain assemblies operated in synchronization by a drive means attached to the sprocket means, whereby the inclined workpiece is received simultaneously by dogs of the chain assemblies; the synchronization being such that a chain transporting an upper end of the workpiece travels faster than a chain transporting a lower end so that the workpiece is still inclined when it enters the process area, the inclination being reduced to zero at a lowermost point of travel and the workpiece being resloped during ascent, the pipe being held in place by traveling compartments formed by the chain, adjacent dogs, and the fixed outer confinement strip.

9. The apparatus of claim 8 wherein the process area is a metal coating area comprised of a pot containing a bath of liquid metal.

* * * * *

UNITED STATES PATENT OFFICE
CERTIFICATE OF CORRECTION

Patent No. 3,701,336     Dated October 31, 1972

Inventor(s) William M. McConnell et al.

It is certified that error appears in the above-identified patent and that said Letters Patent are hereby corrected as shown below:

>Column 1 Line 3 --3,859,794.-- should read
>--3,559,794.--. Column 2 Line 46 --by-- should
>read --be--. Column 2 Line 52 --path 24--
>should read --bath 24--. Column 7 Line 1 --in art.--
>should read --in the art.--. Column 7 Line 10
>--41 and 42,-- should read --40 and 42,--. Column 8
>Line 41 --This enables-- should read --This then
>enables--. Claim 7, Column 12 Line 26 --stripe--
>should read --strip--.

Signed and sealed this 24th day of April 1973.

(SEAL)
Attest:

EDWARD M. FLETCHER, JR.     ROBERT GOTTSCHALK
Attesting Officer     Commissioner of Patents